US012623482B2

(12) United States Patent
Michenaud et al.

(10) Patent No.: US 12,623,482 B2
(45) Date of Patent: May 12, 2026

(54) REPLACEABLE CARTRIDGE FOR A WRITING INSTRUMENT AND METHOD THEREOF

(71) Applicant: SOCIÉTÉ BIC, Clichy (FR)

(72) Inventors: Etienne Michenaud, Clichy (FR); Claude Pedrez, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 5 days.

(21) Appl. No.: 18/710,909

(22) PCT Filed: Nov. 3, 2022

(86) PCT No.: PCT/EP2022/080730
§ 371 (c)(1),
(2) Date: May 16, 2024

(87) PCT Pub. No.: WO2023/088692
PCT Pub. Date: May 25, 2023

(65) Prior Publication Data
US 2025/0010654 A1 Jan. 9, 2025

(30) Foreign Application Priority Data
Nov. 17, 2021 (EP) .................................... 21306601

(51) Int. Cl.
*B43K 8/03* (2006.01)

(52) U.S. Cl.
CPC .................................... *B43K 8/03* (2013.01)

(58) Field of Classification Search
CPC ......... B43K 5/03; B43K 8/10; B65D 51/2835
(Continued)

(56) References Cited

U.S. PATENT DOCUMENTS 984,710 A * 2/1911 Shunk ...................... B43K 5/03 401/40
1,164,157 A * 12/1915 Zollinger ................ B43K 5/03 401/40
(Continued)

FOREIGN PATENT DOCUMENTS

| | | | |
|---|---|---|---|
| DE | 683616 | C | 11/1939 |
| GB | 859820 | A | 1/1961 |
| WO | 2008074202 | A1 | 6/2008 |

OTHER PUBLICATIONS

Goulet, B. (Jun. 29, 2012). Ink cartridges (Fountain Pen 101). YouTube. https://www.youtube.com/watch?app=desktop&v=bHdgxVIPb0E.
(Continued)

*Primary Examiner* — David P Angwin
*Assistant Examiner* — Bradley S Oliver
(74) *Attorney, Agent, or Firm* — Bookoff McAndrews, PLLC

(57) ABSTRACT

A replaceable cartridge including a body extending between a first end and a second end along an axis (A-A), a reservoir defined within the body, the reservoir configured to store a writing material, a barrier included at the second end of the body, the barrier configured to transition from a first state in which the barrier is capable of containing the writing material within the reservoir to a second state in which the barrier is no longer capable of containing the writing material in the reservoir, and a plunger extending between the first end and the second end of the body, the plunger configured to move axially between a first position and a second, causing the barrier to transition from the first state to the second state.

19 Claims, 3 Drawing Sheets

(58) Field of Classification Search
USPC ........................................... 401/40, 132–135
See application file for complete search history.

(56) References Cited

U.S. PATENT DOCUMENTS

| | | | | | |
|---|---|---|---|---|---|
| 3,993,409 | A | 11/1976 | Hart | | |
| 4,781,484 | A * | 11/1988 | Goncalves | B65D 51/2835 | 604/3 |
| 5,884,759 | A * | 3/1999 | Gueret | B65D 51/2871 | 222/145.5 |
| 7,025,200 | B2 * | 4/2006 | Fontana | A61J 1/2093 | 206/222 |
| 7,219,796 | B2 * | 5/2007 | Anderson | B65D 51/2842 | 206/219 |
| 7,252,091 | B1 * | 8/2007 | Wayne | A45D 34/04 | 132/112 |
| 2023/0311557 | A1 * | 10/2023 | Bez | B43K 23/12 | 401/40 |

OTHER PUBLICATIONS

Search Report and Written Opinion issued in International Application No. PCT/EP2022/080730, mailed on Feb. 14, 2023.

* cited by examiner

[Fig. 1]
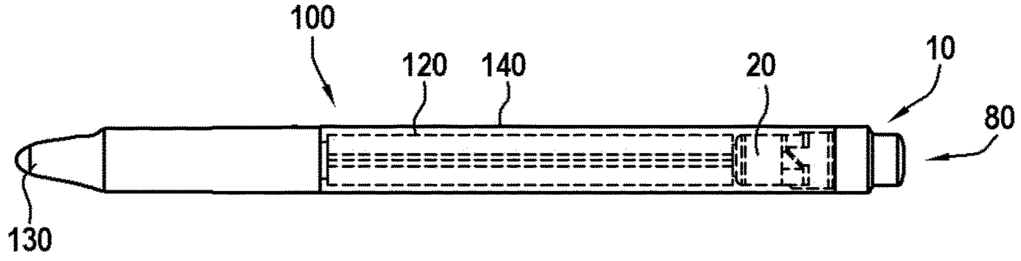
[Fig. 2]
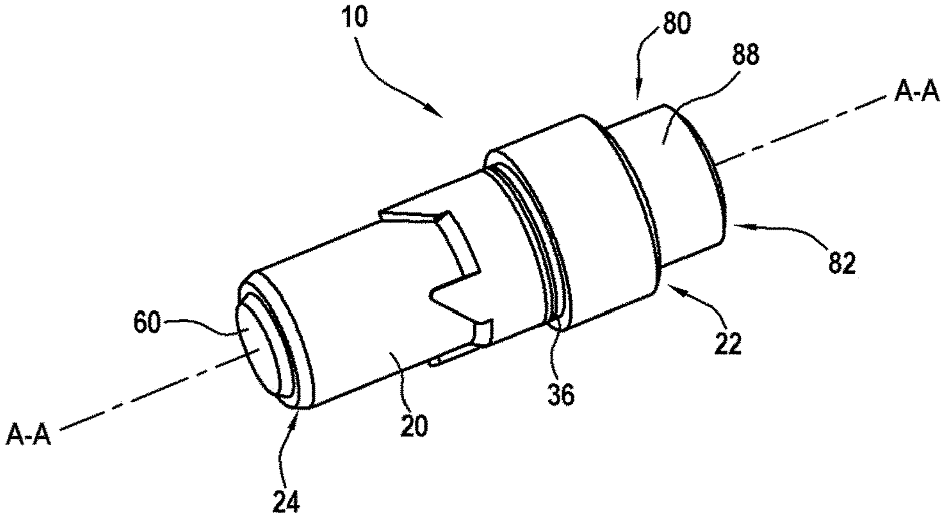
[Fig. 3]
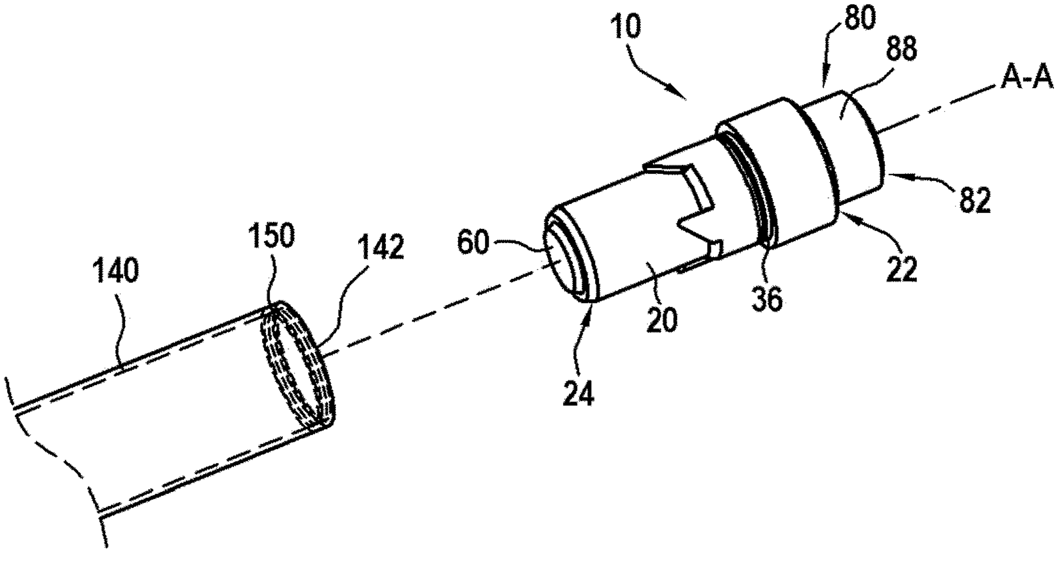

[Fig. 4]
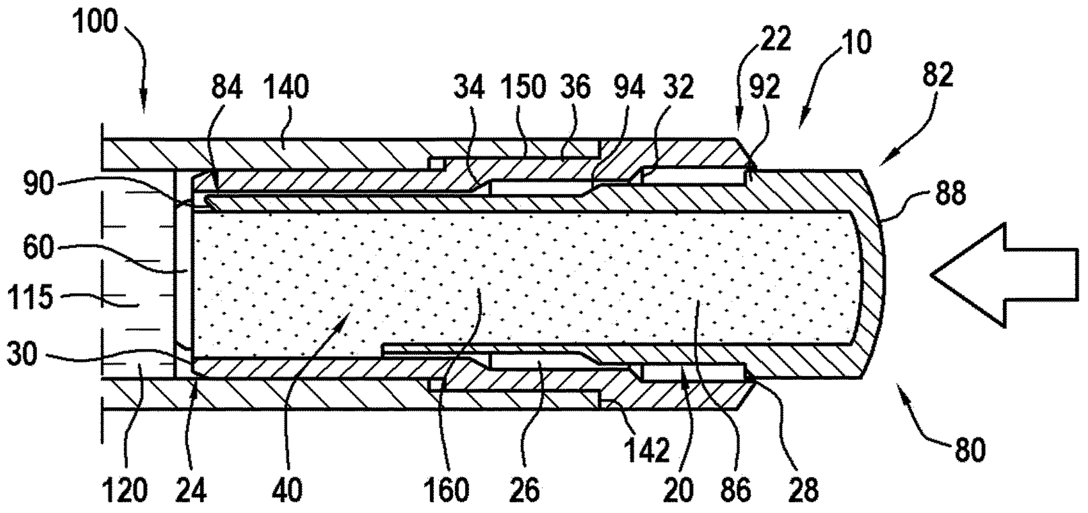
[Fig. 5]
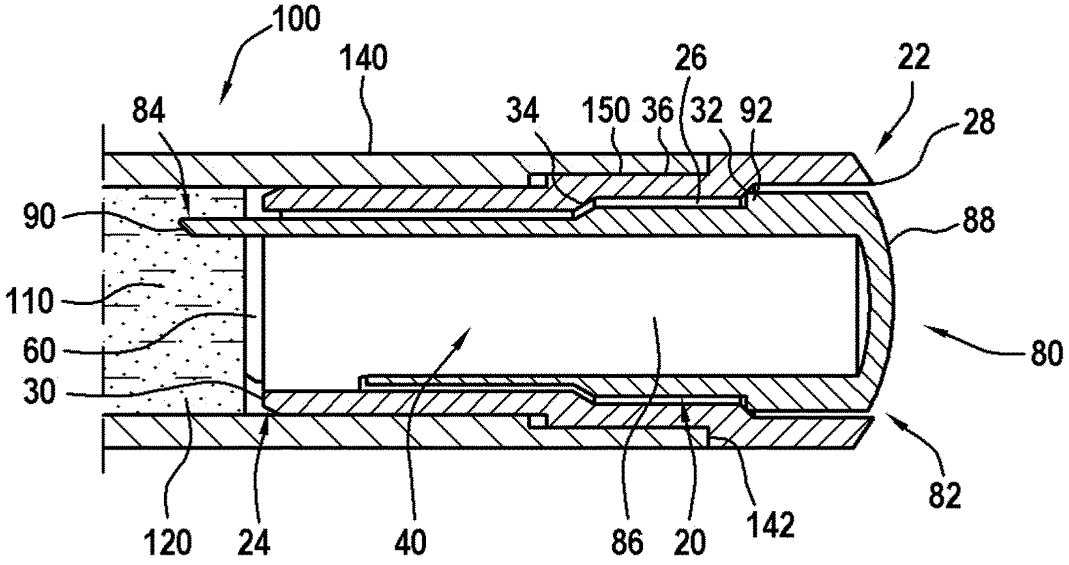

[Fig. 6]
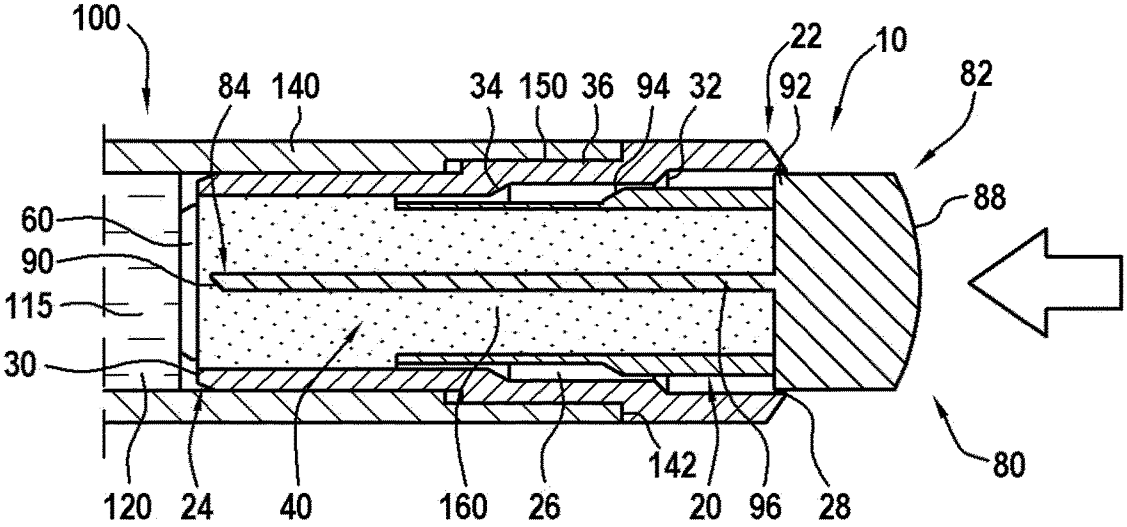
[Fig. 7]
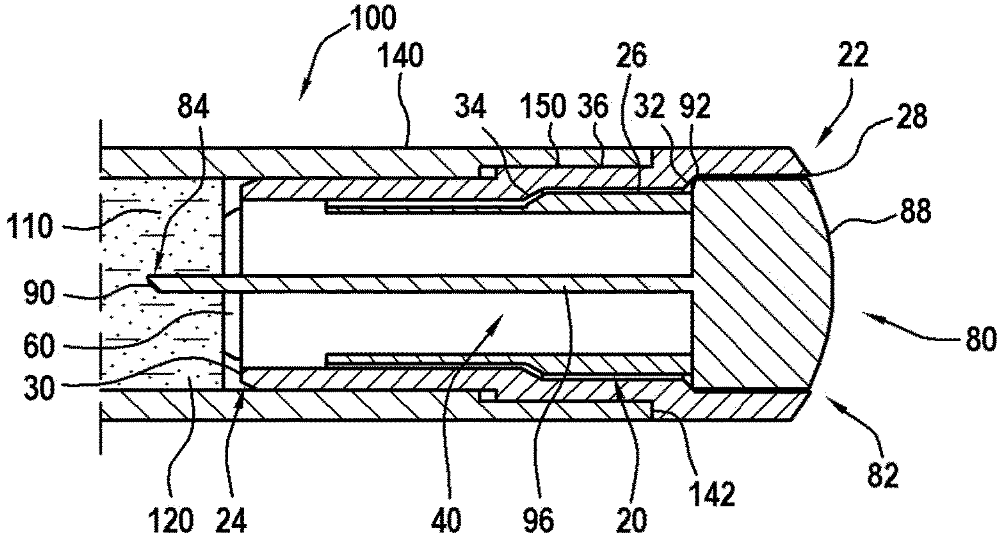

REPLACEABLE CARTRIDGE FOR A WRITING INSTRUMENT AND METHOD THEREOF

CROSS-REFERENCE TO RELATED APPLICATIONS

This is a National Stage Application under 35 U.S.C. § 371 of International Application No. PCT/EP2022/080730, filed Nov. 3, 2022, now published as WO 2023/088692 A1, which claims priority to European Patent Application No. 21306601.2, filed on Nov. 17, 2021, the entireties of which are incorporated herein by reference.

FIELD

This application claims benefit from European patent application EP 21306601.2 filed on 17 Nov. 2021 its content being incorporated herein by reference. The present disclosure relates generally to the field of writing instruments. More specifically, the present disclosure relates to a replaceable cartridge configured for use in a writing instrument.

BACKGROUND

A traditional writing instrument may include a tubular housing, a cartridge configured to store a fluid-based writing medium, such as ink, and a writing tip configured to transfer the writing medium to a surface. In a free ink writing instrument, the writing medium may freely circulate fluidly within the cartridge of the writing instrument. Additionally, the writing medium may circulate in real-time due to forces acting on the writing instrument, such as gravity. In particular, the writing medium may circulate when the writing instrument is handled and/or manipulated by a user. In a free ink writing instrument, to formulate the writing medium, the free ink writing instrument may require injection of a writing material, such as concentrated ink, from the cartridge into a separate chamber of the writing instrument to mix with an additional fluid, such as water, such that the writing medium is ready for use. Downstream from the chamber, the writing medium, once mixed from the writing material and the additional fluid, may be fed to the writing tip.

To extend the lifetime of a writing instrument, the writing instrument may be configured to be refilled with the writing medium. However, in the case of a free ink writing instrument, refilling the writing instrument with the writing material may create a messy situation for a user attempting to refill the writing instrument. As such, a refill for the writing instrument may come in the form of a separate cartridge that is configured to be opened by the writing instrument. Accordingly, the writing instrument may include a dedicated device in the housing of the writing instrument, which is configured to open the cartridge such that the writing material can be transferred from the cartridge to the chamber of the writing instrument. The cartridge opening device included by the writing instrument is typically not easily removable from the writing instrument and/or not easily replaceable. Accordingly, damage and/or wear and tear to the cartridge opening device included by the writing instrument results in the cartridge opening device and, thus, the writing instrument, becoming less efficient and/or entirely non-functional.

It is desirable to provide a replaceable cartridge that is configured for use in a writing instrument, which includes structures and/or relationships configured to open the cartridge in a self-contained manner so as to be replaceable with the cartridge, to improve refilling of the writing instrument in a hassle-free and convenient manner.

SUMMARY

According to aspects of the present disclosure, a replaceable cartridge configured for use in a writing instrument is provided. The replaceable cartridge comprises a body extending between a first end and a second end along an axis, a reservoir defined within at least a portion of the body, the reservoir being configured to store a writing material, a barrier included at the second end of the body, the barrier being configured to transition from a first state in which the barrier is capable of containing the writing material within the reservoir to a second state in which the barrier is no longer capable of containing the writing material within the reservoir, and a plunger extending between the first end and the second end of the body, the plunger being configured to move axially between a first position and a second position, wherein movement of the plunger from the first position to the second position causes the barrier to transition from the first state to the second state.

According to aspects of the present disclosure, the plunger may include an edge being configured to interrupt the barrier when the plunger moves toward the second position.

According to aspects of the present disclosure, interruption of the barrier by the edge of the plunger may include breakage of the barrier.

According to aspects of the present disclosure, the plunger may include a pushable element being configured to be pressed by a user.

According to aspects of the present disclosure, the plunger is formed in one piece.

According to aspects of the present disclosure, the body may include a first opening defined at the first end of the body and a second opening defined at the second end of the body.

According to aspects of the present disclosure, at least a portion of the plunger may project out of the first opening of the body when the plunger is in the first position.

According to aspects of the present disclosure, at least a portion of the plunger may project out of the second opening of the body when the plunger is in the second position.

According to aspects of the present disclosure, at least a portion of the reservoir may be defined within the plunger.

According to aspects of the present disclosure, the barrier may be comprised of a membrane being configured to be broken by the plunger.

According to aspects of the present disclosure, the body may include a stop being configured to abut the plunger when the plunger is in the second position.

According to aspects of the present disclosure, the body may include a coupling member being configured to engage and disengage the writing instrument.

According to aspects of the present disclosure, a method for refilling a writing instrument with a writing material is provided. The method comprises providing the replaceable cartridge according to any aspect disclosed herein, coupling the replaceable cartridge to the writing instrument, and pressing the plunger to move the plunger from the first position to the second position.

According to aspects of the present disclosure, a writing instrument is provided, the writing instrument comprises the replaceable cartridge according to any aspect disclosed herein, a writing tip, a housing, and a coupling member configured to engage and disengage the replaceable cartridge, wherein engagement of the replaceable cartridge with the writing instrument allows a user to refill the writing instrument with the writing material.

According to aspects of the present disclosure, the writing instrument according to any aspect disclosed herein comprises a chamber being configured to receive the writing material from the replaceable cartridge.

In the manner described and according to aspects illustrated herein, the replaceable cartridge, the writing instrument, and the method for refilling a writing instrument with a writing material are capable of providing a replaceable cartridge that includes all components necessary to open the replaceable cartridge in a self-contained manner, so that the components necessary to open the replaceable cartridge are replaceable with the replaceable cartridge, thereby improving replaceability of the replaceable cartridge and refilling of the writing instrument in a hassle-free and convenient manner. Additionally, as only the replaceable cartridge is replaced, a user may refill the writing instrument, without having to replace the writing instrument, thereby reducing excessive usage of plastics and/or other potentially environmentally harmful materials.

BRIEF DESCRIPTION OF THE DRAWINGS

Aspects of an embodiment will be described in reference to the drawings, where like numerals reflect like elements:

FIG. 1 is a side view of a writing instrument and a replaceable cartridge according to aspects of the disclosure;

FIG. 2 is a side perspective view of the replaceable cartridge of FIG. 1;

FIG. 3 is a partial exploded view of the writing instrument and the replaceable cartridge of FIG. 1;

FIG. 4 is a partial cross-sectional view of the writing instrument and the replaceable cartridge of FIG. 1, illustrating a plunger of the replaceable cartridge in a first position;

FIG. 5 is a partial cross-sectional view of the writing instrument and the replaceable cartridge of FIG. 1, illustrating the plunger of the replaceable cartridge in a second position;

FIG. 6 is a partial cross-sectional view of the writing instrument of FIG. 1 and an alternative embodiment of a replaceable cartridge according to aspects of the disclosure, illustrating a plunger of the replaceable cartridge in a first position; and FIG. 7 is a partial cross-sectional view of the writing instrument and the replaceable cartridge of FIG. 6, illustrating the plunger of the replaceable cartridge in a second position.

DETAILED DESCRIPTION

An embodiment of a replaceable cartridge configured for use in a writing instrument, a writing instrument, and a method of refilling a writing instrument with a writing material and/or writing medium according to aspects of the disclosure will now be described with reference to FIGS. 1-7. Like numerals represent like parts, and the replaceable cartridge and the writing instrument will generally be referred to by the reference numerals 10 and 100, respectively. Although the replaceable cartridge 10 and the writing instrument 100 are described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above"

the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIGS. 1-3, the replaceable cartridge 10 (hereafter, "the cartridge 10") is configured for use in a writing instrument 100. Additionally or alternatively, it is contemplated that the cartridge 10 may be considered to be a part of the writing instrument 100. Additionally or alternatively, it is contemplated that the cartridge 10 may be considered and/or used independently of the writing instrument 100. Further, the term "writing instrument" as used herein may be understood to be a tool used to produce writing and/or drawing (e.g. figures, characters, lines, forms, and/or the like) upon a surface. In the disclosed embodiment, the writing instrument 100 may be a ballpoint pen, a rollerball pen, a felt pen, a marker, and/or the like.

As shown in FIGS. 1 and 4-7, the writing instrument 100 may be configured for using free ink. It is contemplated that the term "free ink" as used herein may be understood as system in which a fluid-based writing medium 110 (hereafter, "the writing medium 110"), such as an ink colloid or ink solution, freely circulates fluidly within one or more chamber 120 included by the writing instrument 100 (see FIGS. 5 and 7). Accordingly, the chamber 120 is configured to store and transfer the writing medium 110 to one or more other component of the writing instrument 100. It is contemplated that the writing medium 110 may circulate in real-time due to forces acting on the writing instrument 100, such as gravity. In particular, it is contemplated that the writing medium 110 may circulate when the writing instrument 100 is handled and/or manipulated by a user of the cartridge 10 and/or the writing instrument 100. Additionally, downstream from the chamber 120, the writing medium 110 may be fed to a writing tip 130 of the writing instrument 100 (see FIG. 1). The writing tip 130 may include any structure suitable for absorbing and/or transferring the writing medium 110, such as a fibrous bundle, a capillarity duct, a felt duct, and/or the like. In the disclosed embodiment, the writing instrument 100 is configured to be refillable. Accordingly, the writing instrument 100 may be referred to and/or understood as a "refillable free ink writing instrument."

As illustrated by FIGS. 4-7, to formulate the writing medium 110, the writing instrument 100 requires input and/or injection (hereafter, "transfer") of a writing material 160, such as concentrated ink, into a fluid 115 that is suitable for mixing with the writing material 160 to produce the writing medium 110. In the disclosed embodiment, the fluid 115 for mixing with the writing material 160 may be water. The cartridge 10 is configured to transfer the writing material 160 into the chamber 120, such that the writing instrument 100 is refilled with the writing material 160 and, thus, the writing medium 110. Accordingly, the cartridge 10 is configured to store the writing material 160 (discussed further below). Additionally, the chamber 120 of the writing instrument 100 is configured to store the fluid 115. It is contemplated that the user may add the fluid 115 into the chamber 120 of the writing instrument 100 prior to coupling the cartridge 10 to the writing instrument 100, such that the fluid 115 may then be present and/or stored within the chamber 120 prior to transfer of the writing material 160 to the chamber 120 from the cartridge 10. Accordingly, the chamber 120 of the writing instrument 100 is configured to store the fluid 115 and, subsequently, once the writing material 160 has been transferred from the cartridge 10, the chamber 120 of the writing instrument 100 is configured to store the writing medium 110 formulated from the mixing of the fluid 115 and the writing material 160 in the chamber 120 of the writing instrument 100.

Referring to FIGS. 1-3, the writing instrument 100 includes an elongated cylindrical housing 140 configured to define the chamber 120 and to couple with the cartridge 10. However, it is contemplated that the housing 140 may include a different elongated shape, such as prismatic, e.g. hexagon-prismatic or triangular-prismatic, or any other polygonal-shaped prism that may be compatible with the writing instrument 100. To this end, the housing 140 of the writing instrument 100 includes an opening 142 configured to receive at least a portion of the cartridge 10. Further, the opening 142 is in communication with the chamber 120 to allow for transfer of the writing material 160 from the cartridge 10 to the chamber 120. Additionally, the writing instrument 100 includes a coupling member 150 configured to couple with a complementary coupling member (coupling member 36) of the cartridge 10. The coupling member 150 of the writing instrument 100 may be formed on the housing 140 of the writing instrument 100. In the disclosed embodiment, the coupling member 150 of the writing instrument 100 is configured to form a threaded engagement with the complementary coupling member (coupling member 36) of the cartridge 10; however, it is contemplated that an alternative form of engagement may be compatible with the cartridge 10, such as a bayonet connection or snap-fit connection. Additionally, the writing instrument 100 is configured to extend axially along a common axis A-A of the cartridge 10, which facilitates coupling of the writing instrument 100 with the cartridge 10, as well as transfer of the writing material 160 from the cartridge 10 to the chamber 120 of the writing instrument 100.

Referring to FIGS. 2-3, the cartridge 10 is configured to improve replaceability of the cartridge 10 and refilling of the writing instrument 100 with the writing material 160. To this end, the cartridge 10 includes a body 20 configured to couple to the writing instrument 100, a reservoir 40 configured to store the writing material 160, a barrier 60 configured to seal the reservoir 40 to contain the writing material 160 within the reservoir 40, and a plunger 80 configured to cause the barrier 60 to no longer contain the writing material 160 within the reservoir 40, such that the writing material 160 may be released from the reservoir 40. By employing structures and/or relationships corresponding to the body 20, the reservoir 40, the barrier 60, and the plunger 80, the cartridge 10 is capable of storing and transferring the writing material 160 in a self-contained manner, thereby improving replaceability of the cartridge 10 and refilling of the writing instrument 100 with the writing material 160 and, thus, the writing medium 110.

As shown in FIGS. 2 and 4-7, the body 20 extends between a first end 22 and a second end 24 along an axis A-A. In the disclosed embodiment, at least a portion of the body 20 is configured to be received within the housing 140 of the writing instrument 100 through the opening 142 of the housing 140 of the writing instrument 100. For example, the second end 24 of the body 20 is configured to be received within the housing 140 of the writing instrument 100 through the opening 142 of the housing 140 of the writing instrument 100, but the first end 22 of the body is not configured to be received within the housing 140 of the writing instrument 100, such that the first end 22 of the body 20 is exposed to the user. Limiting the first end 22 of the body 20, such that the first end 22 of the body 20 is not received by the housing 140 of the writing instrument 100, allows the user to handle the cartridge 10 when coupling the cartridge 10 to the writing instrument 100. Additionally, limiting the first end 22 of the body 20, such that the first end 22 of the body 20 is not received by the housing 140 of the writing instrument 100, allows the plunger 80 to be accessible to the user when the cartridge 10 is coupled to the writing instrument (discussed further below).

As shown in FIGS. 4-7, the body 20 is configured to receive the plunger 80 between the first end 22 and the second end 24 of the body 20. Additionally, the body 20 is configured to allow for movement and/or reciprocation of the plunger 80 within the body 20. To this end, the body 20 defines a void 26 between the first end 22 and the second end 24 of the body 20. The void 26 is configured to allow the plunger 80 to be received and to move throughout the body 20, between the first end 22 and the second end 24 of the body 20. Further, the body 20 defines a first opening 28 at the first end 22 of the body 20 and a second opening 30 at the second end 24 of the body 20. The first opening 28 and the second opening 30 of the body 20 are configured to allow portions of the plunger 80 to move into and out of the body 20. Movement of portions of the plunger 80 into and out of the body 20 causes the writing material 160 to no longer be contained by the barrier 60 and/or for the writing material 160 to be released from the cartridge 10 (discussed further below). Additionally, the body 20 includes at least one stop 32, 34 configured to abut the plunger 80 to impede further movement of the plunger 80 within the body 20. In the disclosed embodiment, the body 20 includes a first stop 32 and a second stop 34. Additionally, the first stop 32 and the second stop 34 of the body 20 are axially-spaced from each other along the body 20. By stopping movement of the plunger 80 within the body 20, the plunger 80 is prevented from over-extending into the writing instrument 100. Over-extension of the plunger 80 into the writing instrument 100 may cause a pressure increase within the chamber 120 of the writing instrument 100 and, thus, for a leak to occur. Additionally, over-extension of the plunger 80 into the writing instrument 100 may cause the plunger 80 to be lost within the writing instrument 100. Additionally or alternatively, the at least one stop 32, 34 may provide a sealing effect by sealing the plunger 80 against the body 20 when the plunger 80 is within the body 20. To this end, it is contemplated that a sealing element (not shown), such as an elastically deformable ring, may be included on a surface of the at least one stop 32, 34. In this manner, a leakage may be further prevented.

As shown in FIGS. 1-3, the body 20 is configured to couple with the writing instrument 100. To this end, the body 20 includes a coupling member 36 configured to engage and disengage the writing instrument 100. In particular, the coupling member 36 is configured to engage and disengage the complimentary coupling member 150 included by the writing instrument 100. Engaging and/or coupling the body 20 to the writing instrument 100 places the cartridge 10 into position for refilling the writing instrument 100 with the writing material 160. Disengaging and/or decoupling the body 20 from the writing instrument 100 allows the cartridge 10 to be removed and replaced, so that the writing instrument 100 may be refilled with the writing material 160 from an additional cartridge 10.

As shown in FIGS. 4 and 6, the body 20 is configured such that the writing material 160 may be stored between the first end 22 and the second end 24 of the body 20. To this end, at least a portion of the reservoir 40 is defined within at least a portion of the body 20, within the void 26 of the body 20. In particular, the reservoir 40 is defined and/or extends between at least a portion of the body 20, the barrier 60, and the plunger 80 (discussed further below).

Referring to FIGS. 2 and 4-7, the barrier 60 is included at the second end 24 of the body 20. In particular, the barrier 60 extends across the second end 24 of the body 20, perpendicular to the axis A-A. Referring to FIGS. 4 and 6, the barrier 60 is configured to contain the writing material 160 within the reservoir 40. To this end, the barrier 60 is configured to seal the second end 24 of the body 20. Additionally, referring to FIGS. 5 and 7, the barrier 60 is configured to allow for release of the writing material 160 at the second end 24 of the body 20. To this end, the barrier 60 is configured to transition from a first state to a second state. In the first state, the barrier 60 is intact and extends across the second end 24 of the body 20 to seal the second end 24 of the body 20, such that the barrier 60 contains the writing material 160 within the reservoir 40 and, thus, the cartridge 10. In the second state, the barrier 60 is displaced from and/or interrupted at the second end 24 of the body 20, such that the barrier 60 no longer seals the second end 24 of the body 20 and, thus, no longer contains the writing material 160 within the cartridge 10. As such, when the barrier 60 is displaced from and/or interrupted at the second end 24 of the body 20, the cartridge 10 is capable of releasing the writing material 160, such that the writing material 160 may flow out of the reservoir 40 through the second opening 30 of the body 20. In the disclosed embodiment, displacement and/or interruption of the barrier 60 includes the barrier 60 being broken and/or ruptured upon an exertion of force on the barrier 60. To this end, the barrier 60 is included in the form of a membrane configured to be broken and/or ruptured. In particular, the barrier 60 is made of an elastically deformable material, such as plastic, rubber, silicone, aluminum, and/or the like. Additionally, the barrier 60 includes a thickness within a range of 0.01 mm to 2.00 mm.

As shown in FIGS. 4-7, the plunger 80 extends between a first end 82 and a second end 84 along the axis A-A. Additionally, the plunger 80 is configured to be received within the void 26 defined by the body 20. In the disclosed embodiment, the plunger 80 is arranged concentrically, in surface-to-surface contact with the body 20, within the void 26 defined by the body 20. Further, the plunger 80 is configured to extend between the first end 22 and the second end 24 of the body 20. Referring to FIGS. 4 and 6, the plunger 80 may be configured such that the writing material 160 may be stored between the first end 82 and the second end 84 of the plunger 80. As such, at least a portion of the reservoir 40 may be defined within at least a portion of the plunger 80. To this end, the plunger 80 may define a cavity 86 extending between the first end 82 and the second end 84 of the plunger 80 configured to store the writing material 160. In the disclosed embodiment, the cavity 86 may extend throughout the plunger 80 between the first end 82 and the second end 84 of the plunger 80. The cavity 86 extending throughout the plunger 80 allows the plunger 80 to receive a larger volume of the writing material 160. Accordingly, the plunger 80 may be received within the body 20 without sacrificing a volume of the reservoir 40 defined within the body 20. Alternatively, as shown in FIGS. 6-7, rather than including the cavity 86, the plunger 80 may include an elongated post 96 extending between the first end 82 and the second end 84 of the plunger 80. In this alternative example, the reservoir 40 surrounds at least a portion of the plunger 80. Accordingly, in an alternative manner, the plunger 80 may be received within the body 20 without sacrificing a volume of the reservoir 40 defined within the body 20.

As illustrated by FIGS. 4-7, the plunger 80 is configured to move and/or reciprocate within the void 26 defined by the body 20. In particular, the plunger 80 is configured to move axially between a first position and a second position between the first end 22 and the second end 24 of the body 20. In the disclosed embodiment, the plunger 80 is formed in one piece. Referring to FIGS. 4 and 6, in the first position, the first end 82 of the plunger 80 protrudes out of the first opening 28 of the body 20, so as to be exposed to the user, and the second end 84 of the plunger 80 is oriented within the body 20, axially-spaced from the second opening 30 and, thus, the barrier 60. By protruding out of the first opening 28 of the body 20 when the plunger 80 is in the first position, the first end 82 of the plunger 80 is accessible to the user. To this end, the plunger 80 includes a pushable element 88 at the first end 82 of the plunger 80 that is configured to be pressed by the user when the plunger 80 is in the first position. When the pushable element 88 is pressed by the user, the plunger 80 moves axially from the first position toward the second position. In particular, the first end 82 of the plunger 80 moves axially toward and/or into the first opening 28 of the body 20 and the second end 84 of the plunger 80 moves toward and/or out of the second opening 30 of the body 20.

Referring to FIGS. 5 and 7, in the second position, at least a portion of the first end 82 of the plunger 80 is oriented within the body 20 and at least a portion of the second end 84 of the plunger 80 protrudes out of the second opening 30 of the body 20. In the process of the second end 84 of the plunger 80 moving and protruding out of the second opening 30 of the body 20, when the plunger 80 is moving toward the second position, the second end 84 of the plunger 80 contacts and exerts a force on the barrier 60. Contact and exertion of force by the second end 84 of the plunger 80 on the barrier 60 displaces and/or interrupts the barrier 60. To this end, the plunger 80 includes an edge 90 configured to displace and/or interrupt the barrier 60 at the second end 84 of the plunger 80. In the disclosed embodiment, the edge 90 of the plunger 80 is configured to break and/or rupture the barrier 60. To this end, the edge 90 of the plunger 80 includes an edge apex thickness (sharpness) within a range of 0.50 mm to 2.00 mm. Particularly, the edge 90 of the plunger 80 may include an edge apex thickness of 0.60 mm. Additionally, the plunger 80 includes at least one shoulder 92, 94 configured to abut the body 20 when the plunger 80 is in the second positon. In particular, the plunger 80 includes a first annular shoulder 92 and a second annular shoulder 94 configured to abut the first stop 32 and the second stop 34 when the plunger 80 is in the second position. Accordingly, the first shoulder 92 and the second shoulder 94 are axially-spaced with each other along the plunger 80. In this manner, movement of the plunger 80 from the first position to the second position causes the barrier 60 to transition from the first state to the second state. In particular, movement of the plunger 80 from the first position to the second position causes the barrier 60 to no longer contain the writing material 160 within the reservoir 40 of the cartridge 10 and/or for the writing material 160 to be released from the reservoir 40 of the cartridge 10 through the second opening 30 of the body 20 of the cartridge 10. Including a component configured to open the cartridge 10 on the cartridge 10 to allow for release of the writing material 160, such as the plunger 80, allows the cartridge 10 to be opened in a self-contained manner, without components included on the writing instrument 100 being necessary to open the cartridge 10. Accordingly, as components necessary for opening the cartridge 10 are not included on the writing instrument 100, damage and/or wear and tear to the writing instrument 100 is minimized, thereby avoiding a need to replace the writing instrument 100 and, thus, reducing excessive usage of plastics and/or other potentially environmentally harmful materials.

In operation, the user adds the fluid 115 to the chamber 120 of the writing instrument 100 through the opening 142 of the writing instrument 100. Thereafter, referring to FIGS. 1 and 3, the user inserts the cartridge 10 into the opening 142 of the writing instrument 100 and engages and/or couples the cartridge 10 with the writing instrument 100, so that the cartridge 10 is ready for use on the writing instrument 100. The user presses the pushable element 88 of the plunger 80 to move the plunger 80 axially within the void 26 of the body 20, from the first position toward the second position. As illustrated by FIGS. 4-7, movement of the plunger 80 from the first position to the second position causes the barrier 60 to transition from the first state to the second state. In particular, movement of the plunger 80 from the first position to the second position causes the barrier 60 to no longer contain the writing material 160 within the reservoir 40 and/or for the writing material 160 to be released from the cartridge 10. When writing material 160 is released from the cartridge 10, the writing material 160 is transferred from the reservoir 40 of the cartridge 10 to the chamber 120 of the writing instrument 100. Transfer of the writing material 160 from the reservoir 40 of the cartridge 10 to the chamber 120 of the writing instrument 100 causes the writing material 160 to mix with the fluid 115, thereby formulating the writing medium 110 within the chamber 120 of the writing instrument 100. To replace the cartridge 10 and refill the writing instrument 100 with the writing material 160 and, thus, the writing medium 110, the user disengages and/or decouples the cartridge 10 and repeats the process described above. In this manner, the cartridge 10 includes all components necessary to open the cartridge 10 in a self-contained manner, so that the components necessary to open the cartridge 10 are replaceable with the cartridge 10, thereby improving replaceability of the cartridge 10 and refilling of the writing instrument 100, in a hassle-free and convenient manner. Accordingly, as only the cartridge 10 is replaced, a user may refill the writing instrument 100, without having to replace the writing instrument 100, thereby reducing excessive usage of plastics and/or other potentially environmentally harmful materials.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. A replaceable cartridge configured for use in a writing instrument, the replaceable cartridge comprising:

a body extending between a first end and a second end along an axis;

a reservoir defined within at least a portion of the body, the reservoir configured to store a writing material;

a barrier included at the second end of the body, the barrier configured to transition from a first state in which the barrier is capable of containing the writing material within the reservoir to a second state in which the barrier is no longer capable of containing the writing material within the reservoir; and a plunger extending between the first end and the second end of the body, the plunger configured to move axially between a first position and a second position;

wherein movement of the plunger from the first position to the second position causes the barrier to transition from the first state to the second state, wherein the plunger includes an edge configured to break the barrier, wherein the edge of the plunger is offset from a central axis of the plunger and located at an outermost portion of the plunger, wherein the body includes a first stop and a second stop, wherein the plunger includes a first shoulder and a second shoulder, and wherein the first shoulder is configured to contact the first stop and the second shoulder is configured to contact the second stop when the plunger moves from the first position to the second position.

2. The replaceable cartridge according to claim 1, wherein the plunger includes the edge configured to interrupt the barrier when the plunger moves toward the second position, wherein the interruption of the barrier by the edge of the plunger includes breakage of the barrier.

3. The replaceable cartridge according to claim 1, wherein the plunger includes a pushable element configured to be pressed by a user.

4. The replaceable cartridge according to claim 1, wherein the plunger is formed in one piece.

5. The replaceable cartridge according to claim 1, wherein the body includes a first opening defined at the first end of the body and a second opening defined at the second end of the body, wherein at least a portion of the plunger projects out of the first opening of the body when the plunger is in the first position, and wherein at least a portion of the plunger projects out of the second opening of the body when the plunger is in the second position.

6. The replaceable cartridge according to claim 1, wherein at least a portion of the reservoir is defined within the plunger.

7. The replaceable cartridge according to claim 1, wherein the barrier is comprised of a membrane configured to be broken by the plunger.

8. The replaceable cartridge according to claim 1, wherein the body includes a coupling member configured to engage and disengage the writing instrument.

9. A method for refilling a writing instrument with a writing material, the method comprising:

providing the replaceable cartridge according to claim 1;

coupling the replaceable cartridge to the writing instrument; and pressing the plunger to move the plunger from the first position to the second position.

10. A writing instrument comprising:

a writing tip;

a housing;

a coupling member configured to engage and disengage the replaceable cartridge; and the replaceable cartridge according to claim 1;

wherein engagement of the replaceable cartridge with the writing instrument allows a user to refill the writing instrument with the writing material.

11. The writing instrument according to claim 10, comprising a chamber configured to receive the writing material from the replaceable cartridge.

12. The replaceable cartridge of claim 1, wherein the first stop is axially spaced from the second stop, wherein the first stop includes a seal, wherein the seal is on a surface of the first stop.

13. The replaceable cartridge of claim 1, wherein the edge, the first shoulder, and the second shoulder are enclosed by the first end and the second end of the body.

14. The replaceable cartridge of claim 1, wherein the first shoulder and the second shoulder are configured to abut the body when the plunger is in the second position.

15. The replaceable cartridge of claim 1, wherein the body includes a void extending from the first end to the second end configurable to allow the plunger to be received in the body.

16. The replaceable cartridge of claim 1, wherein the first shoulder is axially spaced from the second shoulder.

17. The replaceable cartridge of claim 1, wherein the first shoulder is axially spaced from the second shoulder, wherein the first shoulder includes a protrusion configured to contact the first stop.

18. The replaceable cartridge of claim 1, wherein the first shoulder is axially spaced from the second shoulder, wherein the second shoulder includes a protrusion configured to contact the second stop.

19. The replaceable cartridge of claim 1, wherein the first shoulder is axially spaced from the second shoulder, wherein the first shoulder includes a first protrusion configured to contact the first stop, wherein the second shoulder includes a second protrusion configured to contact the second stop, wherein the first shoulder is configured to be received within a first void defined by the body, wherein the second shoulder is configured to be received within a second void defined by the body and axially spaced from the first void.

* * * * *